United States Patent [19]

Ringel

[11] Patent Number: 4,533,365

[45] Date of Patent: Aug. 6, 1985

[54] PROCESS FOR THE SEPARATION AND RECYCLING OF $NO_x$ GAS CONSTITUENTS THROUGH ADSORPTION AND DESORPTION ON A MOLECULAR SIEVE

[75] Inventor: Helmut Ringel, Niederzier-Hambach, Fed. Rep. of Germany

[73] Assignee: Kernforschungsanlage Julich Gesellschaft mit beschrankter Haftung, Fed. Rep. of Germany

[21] Appl. No.: 512,032

[22] Filed: Jul. 8, 1983

[30] Foreign Application Priority Data

Jul. 17, 1982 [DE] Fed. Rep. of Germany ....... 3226840

[51] Int. Cl.³ .............................................. B01D 53/04
[52] U.S. Cl. ........................................ 55/28; 55/62; 55/68; 55/75
[58] Field of Search ................... 55/28, 59, 68, 75, 76, 55/62

[56] References Cited

U.S. PATENT DOCUMENTS

| | | | |
|---|---|---|---|
| 1,610,288 | 12/1926 | Jones et al. | 55/68 X |
| 2,629,460 | 2/1953 | Maki | 55/62 X |
| 2,963,519 | 12/1960 | Kasperik et al. | 55/75 X |
| 3,015,369 | 1/1962 | Brennan | 55/68 |
| 3,205,638 | 9/1965 | Hagle | 55/62 X |
| 3,238,701 | 3/1966 | Holt | 55/62 X |
| 3,306,841 | 2/1967 | Ward | 55/62 X |
| 3,542,525 | 11/1970 | Pigford et al. | 55/28 X |
| 3,674,429 | 7/1972 | Collins | 55/76 X |
| 3,689,212 | 9/1972 | Petit et al. | 55/68 X |
| 3,808,327 | 4/1974 | Roberts | 55/68 X |
| 4,153,429 | 5/1979 | Matthews et al. | 55/75 X |

FOREIGN PATENT DOCUMENTS 33877 9/1976 Japan ....................... 55/68

Primary Examiner—Robert H. Spitzer
Attorney, Agent, or Firm—Scully, Scott Murphy & Presser

[57] ABSTRACT

For the separation and recycling of $NO_x$ gas constituents through adsorption and desorption on a molecular sieve the molecular sieve is passed through in sequential, alternating process steps. Initially, the $NO_x$ is retained up to saturation of the molecular sieve. Thereafter the molecular sieve is regenerated through the introduction of gas. In order to reduce the demands during scavenging of the molecular sieve, and then to facilitate the provision of a closed separating and recycling system, the molecular sieve for regeneration is heated to a temperature for desorbing the adsorbed $NO_x$ and scavenged with a portion of the waste gas containing the $NO_x$ which is to be cleaned. The scavenging gas flow is recycled after passing through the molecular sieve.

4 Claims, 2 Drawing Figures

PROCESS FOR THE SEPARATION AND RECYCLING OF NO$_x$ GAS CONSTITUENTS THROUGH ADSORPTION AND DESORPTION ON A MOLECULAR SIEVE

BACKGROUND OF THE INVENTION

1. Field of the Invention

The present invention relates to a process for the separation and recycling of NO$_x$ gas constituents through adsorption and desorption on a molecular sieve. The molecular sieve is presently initially passed through by NO$_x$-containing gas sequential alternating process steps until the molecular sieve is saturated with NO$_x$, and thereafter is regenerated through the introduction of gas.

2. Discussion of the Prior Art

The utilization of a molecular sieve for the separation of nitrous gas constituents from a gas flow is known. During the conduction of waste gas through the molecular sieve, the NO$_x$ gas constituents are bound through adsorption. After a predetermined operating period, the molecular sieve becomes saturated and must be regenerated. Consequently, for a continuous operation it is necessary to connect at least two containers which contain molecular sieves in parallel with each other, and to operate them alternatingly; referring to Norton GmbH, chemical process products, "Zeolon acid resistance molecular sieves", Bulletin Z-51-R1. The molecular sieves are cleansed, after shutting off of the gas flow which is to be purified, through heating, pressure changes or through the intermediary of a scavenging medium, which does not contain the components adsorbed on the molecular sieve. In all of the previously mentioned measures, the nitrous gas constituents desorb from the molecular sieve and are removed. The molecular sieve is, thereafter, again capable for the taking up of NO$_x$ gas constituents.

However, it is advantageous that for the cleaning of the molecular sieve during the desorption of NO$_x$ gas constituents, it is necessary to employ either a complex pumping out or the use of additional carrier gases, which take up the desorbing materials and remove them from the molecular sieve. In the case where there are employed additional carrier gases, the deleterious gas constituents must, in addition, be again isolated from a gas mixture in order to recover the NO$_x$ gas constituents in a concentrated form.

SUMMARY OF THE INVENTION

Accordingly, it is an object of the present invention to provide a process for the separation and recycling of NO$_x$ gas constituents which reduces the demands during the cleaning of the molecular sieve, and which facilitates the formation of a closed separating and recycling system, in particular for a reutilization of the NO$_x$ gas constituents.

The foregoing object pursuant to the invention is achieved through a process of the above-mentioned type, in accordance with which the molecular sieve is for regeneration heated to a temperature which will desorb the adsorbed NO$_x$, and which is scavenged with a portion of NO$_x$-containing waste gas, whereby the scavenging gas flow is recycled after passing through the molecular sieve.

The molecular sieve is constantly subjected to the same NO$_x$- containing waste gas during adsorption as well as during desorption. Intermediate the adsorption and the desorption phases there merely changes the temperature and the quantity of the waste gas which flows through the molecular sieve per unit of time. In an advantageous manner, the desorbed NO$_x$ is contained in the recycled scavenging gas flow at a higher concentration than in the waste gas flow itself. This is especially of use when the recovered NO$_x$ gas constituents are to be reconveyed in a process step in which the nitrous gases are required for the implementation of the process and in which there are produced the waste gases which are to be cleaned on the molecular sieve as provided, for example, in the production of nitric acid. In such an instance, the waste gas flow which is enriched with NO$_x$ subsequent to the scavenging of the molecular sieve, can be introduced directly into the process step.

It is preferable that, for the separation and recycling of the NO$_x$ gas constituents, there be employed a molecular sieve constituted of synthetic mordenite, with hydrogen as the cation and an SiO$_2$ to Al$_2$O$_3$ ratio of 10:1 with a pore width of between 8 to 9 Å. Suitably, such a molecular sieve can be employed at room temperature for the adsorption of the NO$_x$ gas constituents, and for desorption at a temperature of at least 150° C. The molecular sieve evidences a high adsorption capacity at room temperature, and is acid-resistant due to the extensive silicon constituent.

In order to achieve a high concentration of NO$_x$ in the recycled waste gas flow, the molecular sieve is initially heated to the desorption temperature at shut off flow of waste gas, and only after reaching this temperature is scavenged with a small portion of the waste gas.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
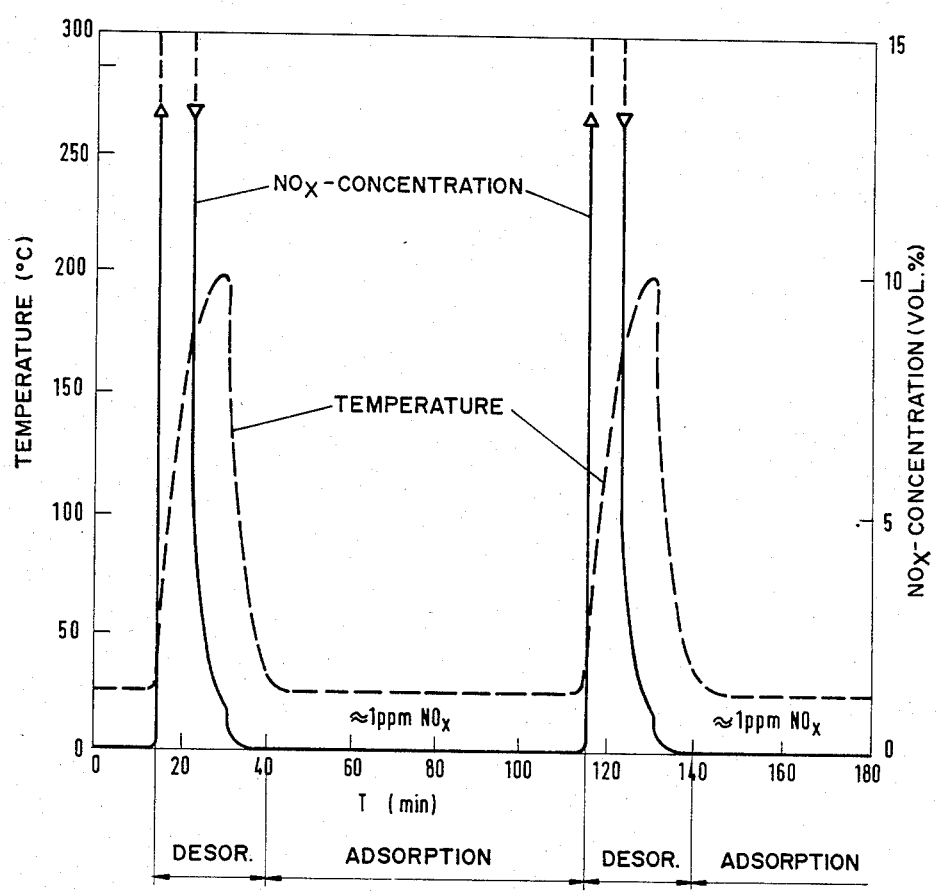
FIG. 1 graphically illustrates a time plot for the periodic adsorption and desorption of NO$_x$ gas constituents.

Periodic cycles of the adsorption and desorption on a molecular sieve are represented in FIG. 1 of the drawings. The cycles are undertaken in a molecular sieve column of 25 cm internal diameter and 200 mm length. Employed for the molecular sieve was synthetic mordenite with hydrogen as cation and an SiO$_2$ to Al$_2$O$_3$ ratio of 10:1. The pore width of the molecular sieve consisted of 8 to 9 Å. A molecular sieve of this type is known, for example, as a molecular sieve commercially sold under the tradename "Zeolon 900H".

Plotted along the abscissa in FIG. 1 is the operating time T of the molecular sieve column, in minutes, whereas plotted along the ordinates are, on the left, the temperature in the molecular sieve in °C., on the right the NO$_x$ concentration in the waste gas at the discharge of the molecular sieve column, in % of volume. Introduced into the molecular sieve is a moist air flow of 150/l/h with 0.5% vol. of NO$_x$ gas constituents at atmospheric pressure.

From FIG. 1 there can be ascertained that, in the illustrated embodiment, the adsorption phase at room temperature takes about 70 minutes, the desorption phase about 30 minutes, comparing in FIG. 1 the temperature plot drawn in phantom lines. During the desorption phase, the temperature in the molecular sieve is raised to 200° C. within about 15 minutes. For scavenging, there is introduced into the molecular sieve column a small air flow of about 5 l/h. The quality of the air flow corresponds to the moist air flow which is to be purified with 0.5% vol of $NO_x$ gas constituents. During the heating of the molecular sieve, the $NO_x$ gas constituents desorb and are conveyed by the air flow out of the molecular sieve. The $NO_x$ concentration in the withdrawn gas can be ascertained from the concentration plot drawn in the solid lines. They reach maximum values in the region of about 50% volume. Within the desorption phase, which lasts about 25 minutes, the $NO_x$ concentration in the waste gas at the discharge of the molecular sieve column again drops down to about 1 ppm $NO_x$ gas constituents. This value is also reached during the adsorption phase in the waste gas flowing off from the molecular sieve.

Figure 2:
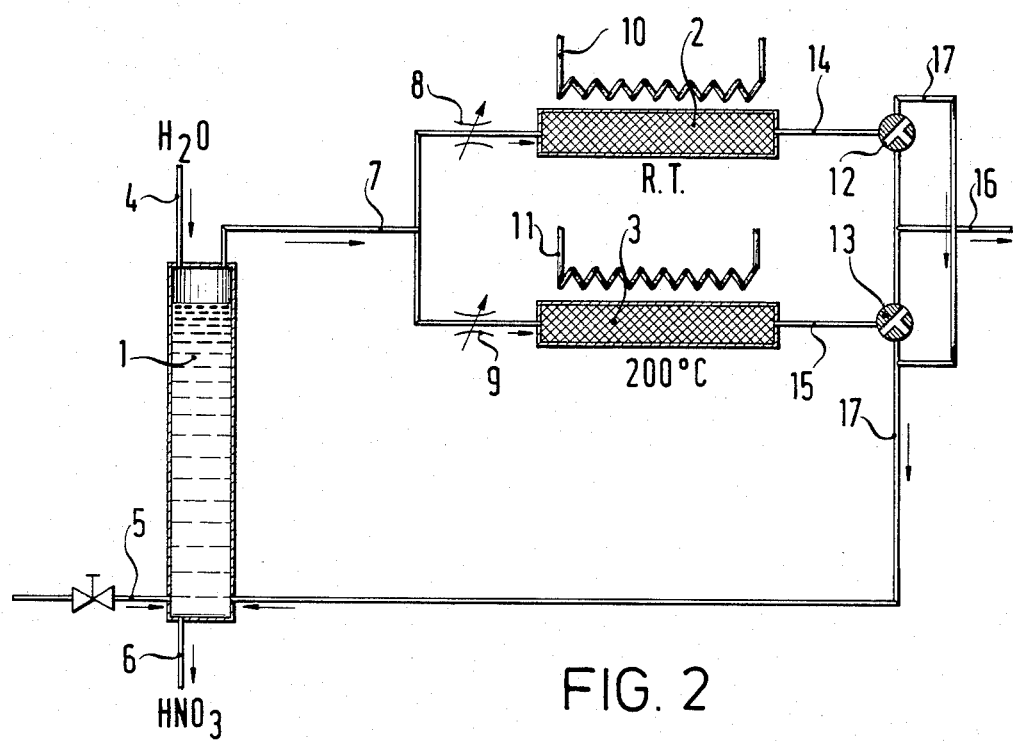
FIG. 2 schematically illustrates a portion of an installation for the recovery of nitrous acid with waste gas scavenging on a molecular sieve.

Illustrated schematically in FIG. 2 is a washing column 1 for the production of nitric acid with subsequent waste gas purification. Provided for waste gas purification are two molecular sieve columns 2 and 3 which are connected in parallel. Connected to the washing column 1 is a water inlet 4 through which water is introduced in counterflow with the $NO_x$-containing gas, which flows into the washing column through a closeable gas conduit 5. The water reacts with the $NO_x$-containing gas under the formation of nitric acid, which flows to the discharge 6 and is removed from the wash column.

The waste gases which exit from the washing column 1, which contain $NO_x$ constituents which are not converted into nitric acid, are conducted through a waste gas conduit 7 to the molecular sieve columns 2, 3 which are connected in parallel. At the inlet to each molecular sieve column, flow regulators 8, 9 are located in the waste gas conduit. The flow regulators serve for the adjustment of the waste gas quantity which is to be conducted into the molecular sieve columns 2, 3. The molecular sieve columns include devices 10, 11 for tempering of the molecular sieve. The molecular sieve is heatable to a temperature of at least 150° C. for the desorption phase and coolable to room temperature after passing through the adsorption phase. The waste gas flowing through the molecular sieve columns is introduceable into a clean gas conduit 16 by means of three-way valves 12, 13, which are located in outlet conduits 14, 15, during the adsorption phase, and introduceable into a return conduit 17 during the desorption phase. The return conduit 17 connects into the washing column 1.

For a waste gas volume of 100 m³/h the molecular sieve columns 2, 3 are designed with a diameter of 25 cm and are about 1.8 m long. As in the embodiment pursuant to FIG. 1, they are filled with molecular sieves of "Zeolon 900 H".

In the embodiment according to FIG. 2, a waste gas containing 0.5% vol. of $NO_x$ constituents flows out of the washing column 1 through the waste gas conduit 7. The waste gas quantity of 100 m³/h is conducted through the molecular sieve column 2, which is set to room temperature. During the throughflow, the $NO_x$ gas constituent from the waste gas adsorbs on the molecular sieve together with steam carried along by the waste gas. The waste gas flows free from $NO_x$ gas constituents from the molecular sieve column 2 through the correspondingly set three-way valve 12 into the clean gas conduit 16. After about four hours the molecular sieve is almost completely saturated with $NO_x$. The throughflow through the molecular sieve column is terminated through closing of the flow regulator 8.

During the adsorption phase of the molecular sieve column 2, the molecular sieve column 3 is desorbed. For this desorption phase, after saturation of the molecular sieve with $NO_x$, there is thereafter closed the flow regulator 9 and the three-way valve 13 is so set that the discharge conduit 15 is connected with the return conduit 17. By means of the device 11, the molecular sieve column is then heated to 200° C. At this temperature the $NO_x$ is almost completely desorbed from the molecular sieve. Hereby, a portion of the $NO_x$ desorbing from the molecular sieve and a portion of the desorbing water exits the molecular sieve column. As soon as the molecular sieve column is uniformly heated to 200° C., the flow regulator 9 is opened to such an extent that a small portion of the waste gas, in the exemplary embodiment 0.5 m³/h (approximately 0.5% of the waste gas flow exiting from the washing column 1), flows out of the waste gas conduit 7 through the molecular sieve column 3 and the desorbed $NO_x$ and the water is completely flushed out of the molecular sieve column. The gas mixture which is so enriched with the $NO_x$ flows back through the return conduit 17 into the washing column 1 and can here be again used through reaction with water for the formation of nitric acid. In conformance with the $NO_x$ quantity which is introduced through the return conduit 17, there can be throttled the infeed of $NO_x$-containing gas through the gas conduit 5.

When the molecular sieve column 3 is scavenged, then the flow regulator 9 and the three-way valve 13 are closed, and the molecular sieve column cooled to room temperature. The entire desorption interval in the exemplary embodiment, lasts for about 2½ hours. During this period a total of about 1 m³ of waste gas flows through the molecular sieve column. Thereafter the molecular sieve column is again available for the cleansing of the waste gas and for the adsorption of $NO_x$ gas constituents. The adsorption phase and desorption phase alternate periodically in the molecular sieve columns 2, 3.

What is claimed is:

1. In a process for the separation and recycling of $NO_x$ gas constituents through adsorption and desorption on a molecular sieve wherein, in alternating process steps, $NO_x$-containing waste gas initially flows through the molecular sieve until saturation of the molecular sieve with $NO_x$, and thereafter the $NO_x$ is desorbed through the introduction of gas; the improvement comprising: heating the molecular sieve for regeneration to a temperature for desorbing the adsorbed $NO_x$; scavenging the molecular sieve with a portion of the $NO_x$-containing waste gas to produce a scavenging gas; and recycling the scavenging gas flow after passing through the molecular sieve wherein said waste gas comprises an untreated feed gas.

2. A process as claimed in claim 1, wherein said molecular sieve is constituted of synthetic mordenite having hydrogen as cation and having an $SiO_2$ to $Al_2O_3$ ratio of 10:1; and wherein the molecular sieve has a pore width of 8 to 9 Å.

3. A process as claimed in claim 2, comprising adsorbing the $NO_x$ gas constituents on the molecular sieve at room temperature, and desorbing the constituents at a temperature of at least 150° C.

4. A process as claimed in claim 1, comprising heating the molecular sieve for regeneration at a terminated waste gas flow; and scavenging said molecular sieve after reaching the desorption temperature with a small portion of the waste gas.

* * * * *